Aug. 29, 1933.   A. HORVATH   1,924,789

EGG OPENER DEVICE

Filed March 17, 1932

Inventor

A. Horvath

By Clarence A. O'Brien

Attorney

UNITED STATES PATENT OFFICE 1,924,789

EGG OPENER DEVICE

Anthony Horvath, Wallingford, Conn.

Application March 17, 1932. Serial No. 599,550

1 Claim. (Cl. 146—2)

This invention relates to a device for opening eggs, the general object of the invention being to provide a sectional receptacle, shaped to receive an egg and the sections of which are hinged together, and spring members extending into the receptacle for breaking and engaging parts of the shell so that when the sections are moved apart, the shell will be split in half so that the contents can drop from the receptacle, or by slightly opening the two sections of the receptacle, the white of the egg can be permitted to escape, while retaining the yoke in the receptacle.

This invention also consists in certain other features of construction and in the combination and arrangement of the several parts to be hereinafter fully described, illustrated in the accompanying drawing and specifically pointed out in the appended claim.

In describing the invention in detail reference will be had to the accompanying drawing wherein like characters denote like or corresponding parts throughout the several views, and in which:—

As shown in these views, the device A is made in the form of an egg and is composed of two substantially semi-spherical sections, 1 and 2 which are hingedly connected together as shown at 3. A strip 4 of spring metal has an intermediate part riveted or otherwise connected to each section as shown at 5, the rivets passing through that part of the section adjacent the outer end thereof and through the side which is opposite the hinged side.

The outer end of each strip is bent to form a ring 6 for receiving a finger or thumb of the hand of the user and its other part is extended along the side of the section to the open end thereof, where the extremity of the strip is bent inwardly to provide a tongue 7 which extends into the section as shown.

The device is moved to open position and an egg placed therein and then the device is closed and the device is struck a blow either by an implement or striking the device against a table or the like to cause the tongues 7 to penetrate the egg shell. Then by opening the device, for instance as shown in Fig. 1, the egg shell will be split apart with a part in each section, so that the contents of the egg will drop from the shell.

By opening the sections to a limited extent, the white of the egg can be allowed to escape while retaining the yoke in the shell.

Figure 1:
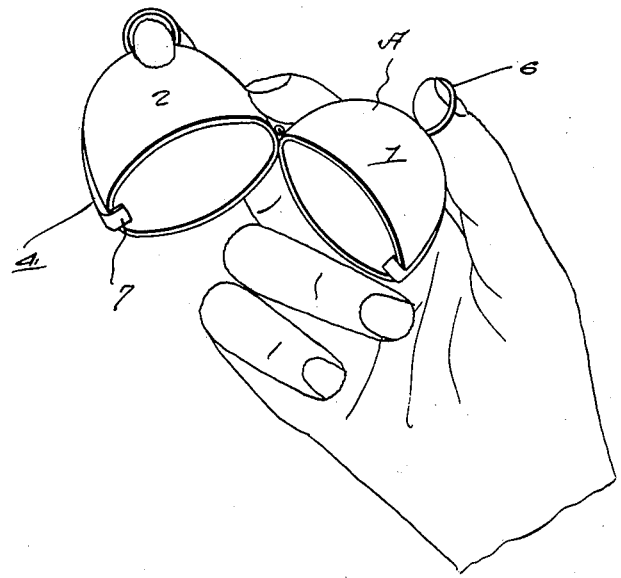
Figure 1 is a perspective view showing the device in use.
Figure 2:
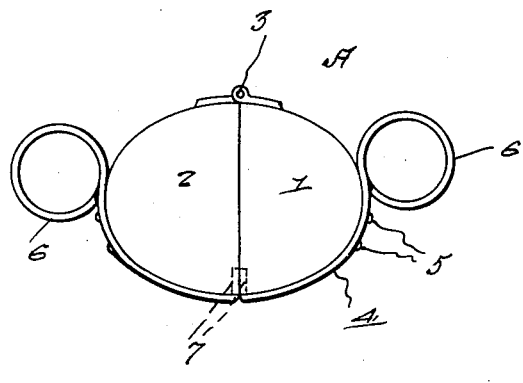
Fig. 2 is an elevation of the device.
Figure 3:
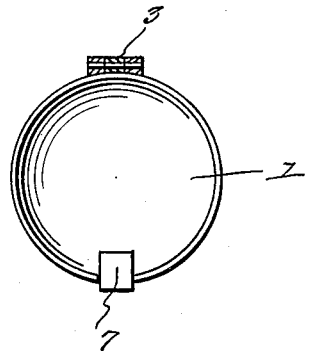
Fig. 3 is a view looking into one section thereof with the hinge in section.

The device is preferably moved to open position with the fingers arranged as shown in Fig. 1.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A device of the class described comprising a pair of substantially semi-spherical sections hingedly connected together, a spring strip having an intermediate portion connected to each section and having one end bent to form a handle ring at the outer end of the section and its other part extending along the section and having its extremity bent inwardly to form a tongue to enter the open end of the section, said tongues acting to penetrate the shell of an egg placed in the device and to split the shell when the two sections are moved to open position.

ANTHONY HORVATH.